US012706660B2

(12) United States Patent
Ling et al.

(10) Patent No.: US 12,706,660 B2

(45) Date of Patent: Aug. 11, 2026

(54) METHOD AND APPARATUS FOR BEAM DETERMINATION

(71) Applicant: LENOVO (BEIJING) LIMITED, Beijing (CN)

(72) Inventors: Wei Ling, Beijing (CN); Chenxi Zhu, Fairfax, VA (US); Bingchao Liu, Beijing (CN); Yi Zhang, Beijing (CN); Lingling Xiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 373 days.

(21) Appl. No.: 18/681,749

(22) PCT Filed: Aug. 3, 2021

(86) PCT No.: PCT/CN2021/110304

§ 371 (c)(1),
(2) Date: Feb. 6, 2024

(87) PCT Pub. No.: WO2023/010280

PCT Pub. Date: Feb. 9, 2023

(65) Prior Publication Data

US 2024/0356623 A1 Oct. 24, 2024

(51) Int. Cl.

| | |
|---|---|
| ***H04B 7/06*** | (2006.01) |
| ***H04L 5/00*** | (2006.01) |
| ***H04W 72/232*** | (2023.01) |

(52) U.S. Cl.

CPC ....... *H04B 7/06964* (2023.05); *H04L 5/0053* (2013.01); *H04L 5/0094* (2013.01); *H04W 72/232* (2023.01)

(58) Field of Classification Search

CPC .. H04W 72/232; H04L 5/0053; H04L 5/0094; H04B 7/06964

See application file for complete search history.

(56) References Cited

U.S. PATENT DOCUMENTS

| | | | | |
|---|---|---|---|---|
| 2019/0319833 | A1* | 10/2019 | Nagaraja | ............. H04L 41/0668 |
| 2020/0350972 | A1 | 11/2020 | Yi et al. | |

(Continued)

FOREIGN PATENT DOCUMENTS

| | | | |
|---|---|---|---|
| CN | 110351112 | A | 10/2019 |
| CN | 110637496 | A | 12/2019 |

(Continued)

OTHER PUBLICATIONS

International Search Report and Written Opinion dated Apr. 26, 2022 for International Application No. PCT /CN2021/110304.

*Primary Examiner* — Gbemileke J Onamuti

(74) *Attorney, Agent, or Firm* — AMPACC Law Group, PLLC

(57) ABSTRACT

Embodiments of the present application are related to a method and apparatus for beam determination. An exemplary method includes: receiving configuration information at least indicating two failure detection resource sets in a cell; transmitting failure recovery information at least indicating a radio link quality of all failure detection resources in a first failure detection resource set of the two failure detection resource sets is worse than a first threshold; and monitoring physical downlink control channels (PDCCH)s in a control resource set (CORESET) in the cell based on the failure recovery information, wherein one or more transmission configuration indicator (TCI) states are activated for the CORESET and one TCI state of the one or more TCI states is associated with the first failure detection resource set, after a number of symbols from a last symbol of a received PDCCH for confirming the failure recovery information.

20 Claims, 6 Drawing Sheets

(56) References Cited

U.S. PATENT DOCUMENTS

2021/0105759 A1 4/2021 Bai
2021/0105765 A1* 4/2021 Cirik .................... H04B 7/0695
2021/0112619 A1 4/2021 Bai

FOREIGN PATENT DOCUMENTS

CN 112088545 A 12/2020
CN 112400283 A 2/2021
WO 2021083224 A1 5/2021

* cited by examiner

METHOD AND APPARATUS FOR BEAM DETERMINATION

CROSS REFERENCE TO RELATED APPLICATIONS

This application is a national phase entry of International Application No. PCT/CN2021/110304, filed on Aug. 3, 2021, which is incorporated by reference in its entirety.

TECHNICAL FIELD

Embodiments of the present application generally relate to wireless communication technology, and in particular to a method and an apparatus for beam determination, especially after beam failure recovery (BFR) is confirmed, e.g., in scenarios of multiple transmit-receive points (TRPs).

BACKGROUND

Multi-TRP/panel transmission has been introduced into new radio (NR) since Release 16 (R16), and enhancements on multiple-input multiple-output (MIMO) for NR have been discussed, for example in RP-182067. During multi-TRP transmission, two or more TRPs (or panels) may be used to transmit data to a user equipment (UE) to improve reliability and robustness. A work item description (WID) approved on multiple-input multiple-output (MIMO) in NR Release 17 (R17) includes a research topic, evaluating and; if needed, specifying beam-management-related enhancements for simultaneous multi-TRP transmission with multi-panel reception. A beam can be represented by various manners, e.g., "spatial relation information" etc.

There are various technical problems to be solved to support multi-TRP transmission, e.g., beam determination in multi-TRP scenarios considering TRP-specific BFR. TRP-specific BFR is agreed to be supported in R17, which is designed based on R16 secondary cell (SCell) BFR scheme. According to the latest agreements, after the network side confirms a TRP-specific BFR, the beam of a control resource set (CORESET) should be updated according to the new beam(s) reported by the remote side. However, in single downlink control information (DCI) based multi-TRP transmission scenarios, UE cannot be aware with which TRP a CORESET is associated due to no corresponding CORESETPoolIndex being configured. Besides, when two TCI states are activated for a CORESET, UE cannot be aware with which TRP the two transmission configuration indicator (TCI) states are associated respectively, either. Therefore, how to determine beam(s) for a CORESET after the TRP-specific BFR is confirmed should be solved, especially, in multi-TRP transmission scenarios.

Given the above, it is desirable to improve technology for beam determination to at least support multi-TRP transmission and TRP-specific BFR.

SUMMARY OF THE APPLICATION

One objective of the present application is to provide a technical solution for beam determination, which can enhance the beam management, e.g., in multi-TRP transmission scenarios.

According to some embodiments of the present application, a method may include: receiving configuration information at least indicating two failure detection resource sets in a cell; transmitting failure recovery information at least indicating a radio link quality of all failure detection resources in a first failure detection resource set of the two failure detection resource sets is worse than a first threshold; and monitoring physical downlink control channels (PDCCH) s in a CORESET in the cell based on the failure recovery information, wherein one or more TCI states are activated for the CORESET and one TCI state of the one or more TCI states is associated with the first failure detection resource set, after a number of symbols from a last symbol of a received PDCCH for confirming the failure recovery information.

In some embodiments of the present application, any TCI state activated for the CORESET is associated with a corresponding failure detection resource set of the two failure detection resource sets by a media access control (MAC) control element (CE) or radio resource control (RRC) signaling.

In some embodiments of the present application, in the case that: the failure recovery information indicates that only the radio link quality of all failure detection resources in the first failure detection resource set is worse than a first threshold and a first reference signal with a radio link quality larger than or equal to a second threshold is found from a candidate resource set associated with the first failure detection resource set; and only the one TCI state associated with the first failure detection resource set is activated for the CORESET; the method includes monitoring the PDCCHs in the CORESET in the cell using same antenna port quasi co-location parameters as the first reference signal, after a number of symbols from a last symbol of a received PDCCH for confirming the failure recovery information.

In some embodiments of the present application, the one or more TCI states include another TCI state associated with a second failure detection resource set of the two failure detection resource sets, and in the case that: the failure recovery information indicates that only the radio link quality of all failure detection resources in the first failure detection resource set is worse than a first threshold and a first reference signal with a radio link quality larger than or equal to a second threshold is found from a candidate resource set associated with the first failure detection resource set; the method includes: after a number of symbols from a last symbol of a received PDCCH for confirming the failure recovery information, monitoring the PDCCHs in the CORESET in the cell using same antenna port quasi co-location parameters as the first reference signal and the other TCI state in the case that the first reference signal and another reference signal associated with the other TCI state can be received simultaneously.

In some embodiments of the present application, in the case that: the failure recovery information also indicates that a radio link quality of all failure detection resources in a second failure detection resource set of the two failure detection resource sets is worse than a third threshold, a first reference signal with a radio link quality larger than or equal to a second threshold is found from a candidate resource sets associated with the first failure detection resource set, and a second reference signal with a radio link quality larger than or equal to a fourth threshold is found from another candidate resource set associated with the second failure detection resource sets; and only the one TCI state associated with the first failure detection resource set is activated for the CORESET; the method includes: monitoring the PDCCHs in the CORESET in the cell using same antenna port quasi co-location parameters as the first reference signal, after a number of symbols from a last symbol of a received PDCCH for confirming the failure recovery information.

In some embodiments of the present application, the one or more TCI states include another TCI state associated with a second failure detection resource set of the two failure detection resource sets, and in the case that: the failure recovery information also indicates that the radio link quality of all failure detection resources in a second failure detection resource set of the two failure detection resource sets is worse than a third threshold, a first reference signal with a radio link quality larger than or equal to a second threshold is found from a candidate resource sets associated with the first failure detection resource set, and a second reference signal with a radio link quality larger than or equal to a fourth threshold is found from another candidate resource set associated with the second failure detection resource set; the method includes: after a number of symbols from a last symbol of a received PDCCH for confirming the failure recovery information, monitoring the PDCCHs in the CORESET in the cell using same antenna port quasi co-location parameters as the first reference signal and the second reference signal in the case that the first reference signal and the second reference signal can be received simultaneously.

In some embodiments of the present application, in the case that: the failure recovery information indicates that the radio link quality of all failure detection resources in a second failure detection resource set of the two failure detection resource sets is worse than a third threshold and only one reference signal with a radio link quality larger than or equal to a corresponding threshold is found from a candidate resource set associated with one of the two failure detection resource sets; the method includes: monitoring the PDCCHs in any CORESET in the cell using same antenna port quasi co-location parameters as the one reference signal, after a number of symbols from a last symbol of a received PDCCH for confirming the failure recovery information.

In some embodiments of the present application, in the case that: the failure recovery information also indicates that the radio link quality of all failure detection resources in a second failure detection resource set of the two failure detection resource sets is worse than a third threshold and only a first reference signal with a radio link quality larger than or equal to a second threshold is found from a candidate resource set associated with the first failure detection resource set; the method includes: monitoring the PDCCHs in the CORESET in the cell using same antenna port quasi co-location parameters as the first reference signal, after a number of symbols from a last symbol of a received PDCCH for confirming the failure recovery information.

According to some other embodiments of the present application, another method may include: transmitting configuration information at least indicating two failure detection resource sets in a cell; receiving failure recovery information at least indicating a radio link quality of all failure detection resources in a first failure detection resource set of the two failure detection resource sets is worse than a first threshold; and transmitting PDCCHs in a CORESET in the cell based on the failure recovery information, wherein one or more TCI states are activated for the CORESET and one TCI state of the one or more TCI states is associated with the first failure detection resource set, after a number of symbols from a last symbol of a transmitted PDCCH for confirming the failure recovery information.

In some embodiments of the present application, in the case that: the failure recovery information indicates that only the radio link quality of all failure detection resources in the first failure detection resource set is worse than a first threshold and a first reference signal with a radio link quality larger than or equal to a second threshold is found from a candidate resource set associated with the first failure detection resource set is found; and only the one TCI state associated with the first failure detection resource set is activated for the CORESET; the method includes: transmitting the PDCCHs in the CORESET in the cell using same antenna port quasi co-location parameters as the first reference signal, after a number of symbols from a last symbol of a transmitted PDCCH for confirming the failure recovery information.

In some embodiments of the present application, the one or more TCI states include another TCI state associated with a second failure detection resource set of the two failure detection resource sets, and in the case that: the failure recovery information indicates that only the radio link quality of all failure detection resources in the first failure detection resource set is worse than a first threshold and a first reference signal with a radio link quality larger than or equal to a second threshold is found from a candidate resource set associated with the first failure detection resource set; the method includes: after a number of symbols from a last symbol of a transmitted PDCCH for confirming the failure recovery information, transmitting the PDCCHs in the CORESET in the cell using same antenna port quasi co-location parameters as the first reference signal and the other TCI state in the case that the first reference signal and another reference signal associated with the other TCI state can be received simultaneously.

In some embodiments of the present application, in the case that: the failure recovery information also indicates that a radio link quality of all failure detection resources in a second failure detection resource set of the two failure detection resource sets is worse than a third threshold, a first reference signal with a radio link quality larger than or equal to a second threshold is found from a candidate resource sets associated with the first failure detection resource set, and a second reference signal with a radio link quality larger than or equal to a fourth threshold is found from another candidate resource set associated with the second failure detection resource set; and only the one TCI state associated with the first failure detection resource set is activated for the CORESET; the method includes: transmitting the PDCCHs in the CORESET in the cell using same antenna port quasi co-location parameters as the first reference signal, after a number of symbols from a last symbol of a transmitted PDCCH for confirming the failure recovery information.

In some embodiments of the present application, the one or more TCI states include another TCI state associated with a second failure detection resource set of the two failure detection resource sets, and in the case that: the failure recovery information also indicates that the radio link quality of all failure detection resources in a second failure detection resource set of the two failure detection resource sets is worse than a third threshold, a first reference signal with a radio link quality larger than or equal to a second threshold is found from a candidate resource sets associated with the first failure detection resource set, and a second reference signal with a radio link quality larger than or equal to a fourth threshold is found from another candidate resource set associated with the second failure detection resource set; the method includes: after a number of symbols from a last symbol of a transmitted PDCCH for confirming the failure recovery information, transmitting the PDCCHs in the CORESET in the cell using same antenna port quasi co-location parameters as the first reference signal and the second reference signal in the case that the first reference signal and the second reference signal can be received simultaneously.

In some embodiments of the present application, in the case that: the failure recovery information also indicates that the radio link quality of all failure detection resources in a second failure detection resource set of the two failure detection resource sets is worse than a third threshold and only one reference signal with a radio link quality larger than or equal to a corresponding threshold is found from a candidate resource set associated with one of the two failure detection resource sets; the method includes: transmitting the PDCCHs in any CORESET in the cell using same antenna port quasi co-location parameters as the one reference signal, after a number of symbols from a last symbol of a transmitted PDCCH for confirming the failure recovery information.

In some embodiments of the present application, in the case that: the failure recovery information indicates that the radio link quality of all failure detection resources in a second failure detection resource set of the two failure detection resource sets is worse than a third threshold and only a first reference signal with a radio link quality larger than or equal to a second threshold is found from a candidate resource set associated with the first failure detection resource sets; the method includes: transmitting the PDCCHs in the CORESET in the cell using same antenna port quasi co-location parameters as the first reference signal, after a number of symbols from a last symbol of a transmitted PDCCH for confirming the failure recovery information.

Some embodiments of the present application also provide an apparatus, which include: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method according an embodiment of the present application with the at least one receiving circuitry, the at least one transmitting circuitry and the at least one processor.

Given the above, embodiments of the present application at least provide a technical solution for beam determination for PDCCHs, especially considering TRP-specific BFR in scenarios of multi-TRP transmission, which will facilitate the deployment and implementation of the NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present application are also applicable to similar technical problems; and moreover, the terminologies recited in the present application may change, which should not affect the principle of the present application.

A wireless communication system generally includes one or more base stations (BSs) and one or more UE. Furthermore, a BS may be configured with one TRP (or panel) or more TRPs (or panels). A TRP can act like a small BS. The TRPs can communicate with each other by a backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g. on the order of tens of milliseconds, than that of the ideal backhaul link.

In a wireless communication system, a single TRP can be used to serve one or more UE under the control of a BS. In different scenarios, a TRP may be referred to as different terms. Persons skilled in the art should understand that as 3GPP and the communication technology develop, the terminologies recited in the specification may change, which should not affect the scope of the present application. It should be understood that the TRP(s) (or panel(s)) configured for the BS may be transparent to a UE.

Figure 1:
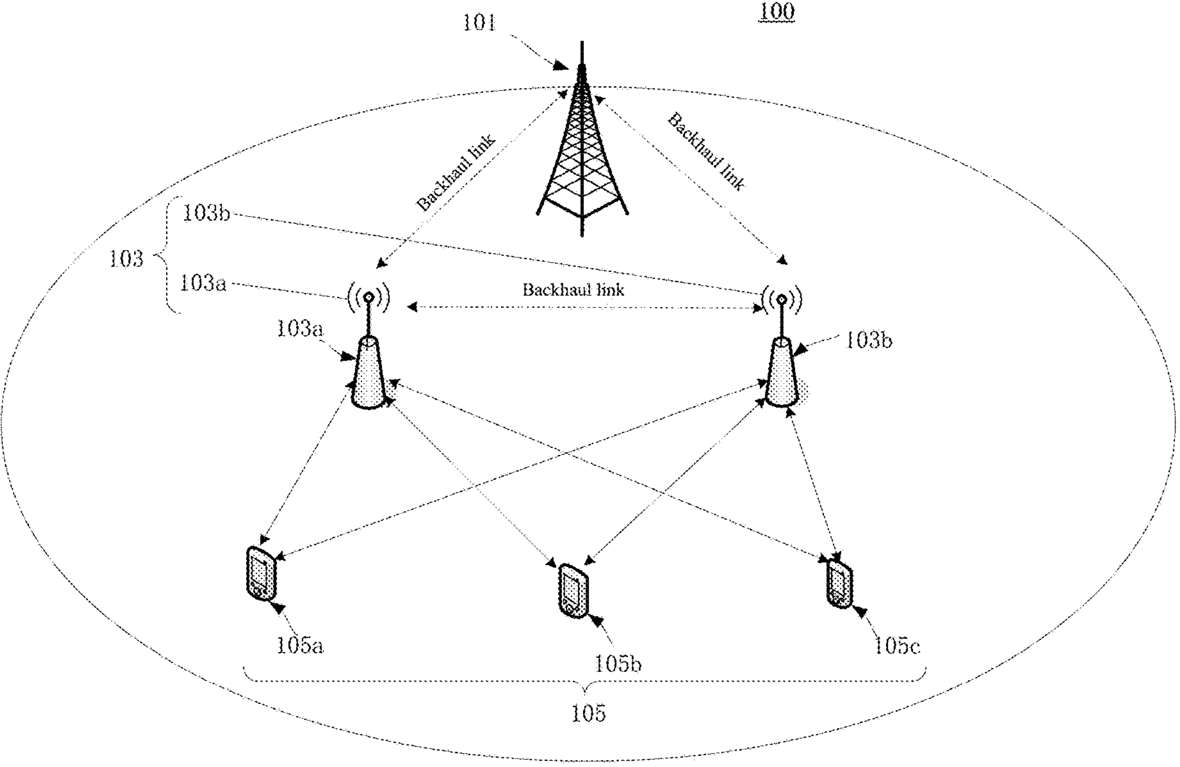
FIG. 1 is a schematic diagram illustrating an exemplary wireless communication system according to some embodiments of the present application.

FIG. 1 is a schematic diagram illustrating an exemplary wireless communication system 100 according to some embodiments of the present application.

Referring to FIG. 1, a wireless communication system 100 can include a base station (BS) 101, TRPs 103 (e.g., a TRP 103*a* and a TRP 103*b*), and UEs 105 (e.g., a UE 105*a*, a UE 105*b*, and a UE 105*c*). Although only one base station 101, two TRPs 103 and three UEs 105 are shown for simplicity, it should be noted that the wireless communication system 100 may include more or less communication device(s) or apparatus in accordance with some other embodiments of the present application.

In some embodiments of the present application, a BS 101 may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. The UEs 105 (for example, the UE 105*a*, the UE 105*b*, and the UE 105*c*) may include, for example, but is not limited to, a computing device, a wearable device, a mobile device, an IoT device, a vehicle, etc.

The TRPs 103, for example, the TRP 103*a* and the TRP 103*b* can communicate with the base station 101 via, for example, a backhaul link. Each of TRPs 103 can serve some or all of UEs 105. As shown in FIG. 1, the TRP 103*a* can serve some mobile stations (which include the UE 105*a*, the UE 105*b*, and the UE 105*c*) within a serving area or region (e.g., a cell or a cell sector). The TRP 103*b* can serve some mobile stations (which include the UE 105*a*, the UE 105*b*, and the UE 105*c*) within a serving area or region (e.g., a cell or a cell sector). The TRP 103*a* and the TRP 103*b* can communicate with each other via, for example, a backhaul link.

The multi-TRP transmission may refer to at least two TRPs (or panels) to transmit data to a UE. As shown in FIG. 1, for the same UE 105 (e.g., the UE 105*a*, the UE 105*b*, or the UE 105*c*), two TRPs (e.g., the TRP 103*a* and the TRP 103*b*) may both transmit data to it, which is an exemplary scenario of the multi-TRP transmission. A multi-TRP transmission scenario can also be referred to as a multi-TRP scenario or multi-panel scenario.

In addition, in R15, a random access channel (RACH)-based BFR is defined for primary cell (PCell); and in R16, a MAC CE-based BFR is defined for SCell. However, both the BFRs for PCell and SCell are only defined for single-TRP transmission. For multi-TRP transmission, the beam failure recovery can be performed respectively for each TRP, i.e., TRP-specific BFR, which is agreed to be supported in R17 and is designed based on R16 SCell BFR scheme. According to the latest agreements, two failure detection resource sets, e.g., two beam failure detection (BFD)-reference signals (RSs) sets will be configured in a cell, wherein each failure detection resource set is associated with a TRP. In addition, two candidate resource sets, e.g., new beam indicator (NBI)-RS sets are configured by one to one associated with the two failure detection resource sets, wherein each candidate resource set is associated with a corresponding failure detection resource set. Each resource in a failure detection resource set and candidate resource sets represent a corresponding beam.

When a radio link quality of all failure detection resources in a failure detection resource set is worse than a threshold, it means the failure detection resource set is failed. UE will try to find a new resource (i.e., a beam) from its associated candidate resource set, and report the found beam via a MAC CE if it is found or report a no new beam indication via the MAC CE if no new beam can be found. After the network side confirmed the TRP-specific BFR, the beam of a CORESET in the cell should be updated according to the reported new beam(s) in the MAC CE. However, in single DCI based multiple TRP transmission scenarios, UE cannot be aware with which TRP a CORESET is associated due to no corresponding CORESETPoolIndex being configured. Besides, when two TCI states are activated for a CORESET, UE cannot be aware with which TRP the two TCI states are associated respectively, either. Therefore, how to determine beam(s) for a CORESET in a cell after the network side confirmed the TRP-specific BFR should be solved in multi-TRP transmission scenarios, wherein at least one CORESET in the cell is activated with multiple TCI states.

At least considering the above technical problem, embodiments of the present application provide technical solutions for beam determination, especially in a multi-TRP or multi-panel scenario considering TRP-specific BFR, thereby improving the beam management in the multi-TRP transmission.

Figure 2:
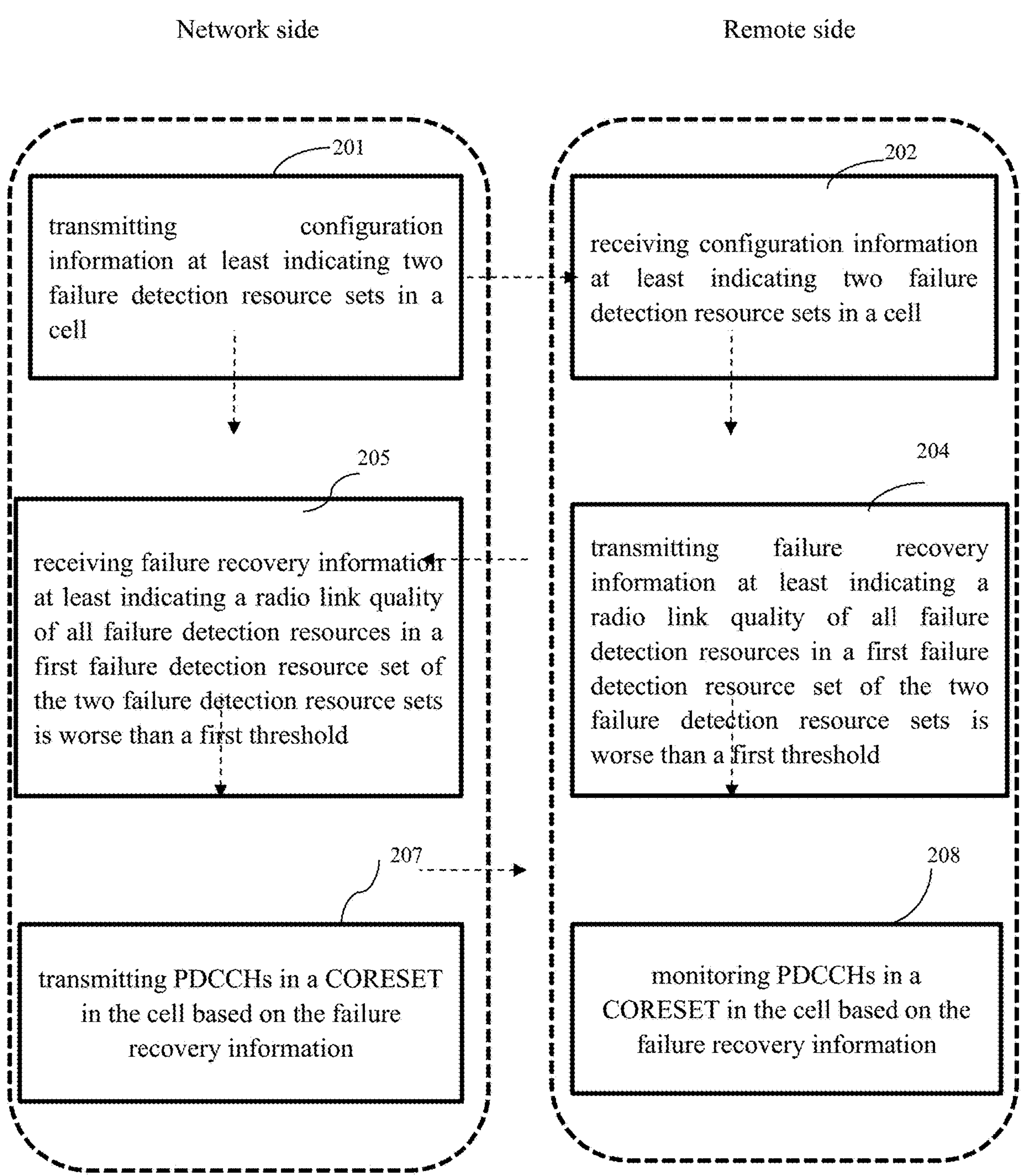
FIG. 2 is a flow chart illustrating a method for beam determination according to some embodiments of the present application.

FIG. 2 is a flow chart illustrating a method for beam determination according to some embodiments of the present application. Although the method is illustrated in a system level by a network side, e.g., a BS 101 and a remote side, e.g., a UE 105, persons skilled in the art can understand that the method implemented in the UE and that implemented in the BS can be separately implemented and incorporated by other apparatus with the like functions.

As shown in FIG. 2, in step 201, the network side, e.g., the BS 101 or TRP 103 as illustrated and shown in FIG. 1 may transmit configuration information to the remote side, e.g., the UE 105 as illustrated and shown in FIG. 1. Accordingly, the remote side e.g., the UE 105 as illustrated and shown in FIG. 1 will receive the configuration information from the network side in step 202.

To detect the beam condition per TRP, separate failure detection resource set is configured for each TRP in a multi-TRP or multi-panel scenario. According to current agreements, there are up to two TRPs in a multi-TRP scenario, and thus two failure detection resource sets will be configured. Accordingly, in some embodiments of the present application, the configuration information may at least indicate: two failure detection resource sets, e.g., two BFD-RS sets in a cell, so that TRP-specific BFR in the cell can be supported in the multi-TRP or multi-panel scenario. As the evolution of 3GPP specifications or other related specifications/protocols, in the case that there are more than two TRPs in a multi-TRP scenario, there will be more than two failure detection resource sets considering TRP-specific BFR. Thus, although exemplary embodiments of the present application are mainly illustrated based on the current agreements, persons skilled in the art should well know how to apply the technical solution disclosed in the present application to scenarios with more than two TRPs.

Each failure detection resource set may include at least one RS (or RS resource), e.g., at least one channel state information-reference signal (CSI-RS) resource. In some embodiments of the present application, each failure detection resource set may be configured by a RRC signaling. For example, a failure detection resource set indicated in the configuration information may be represented by a set of periodic CSI-RS resource configuration indexes, which can be configured by a high layer parameter failureDetectionResources as defined in TS38.213. When there is no failure detection resource set configured by the RRC signaling, the UE may determine each failure detection resource set to include periodic CSI-RS resource configuration indexes with the same values as the RS indexes in the RS sets indicated by a TCI state for respective CORESET with the same value of CORESETPoolIndex or CORESETGroupIndex when two CORESETPoolIndex values or two CORESETGroupIndex values are configured for CORSETs that the UE uses for monitoring PDCCH. When there are two RS indexes in a TCI state, each failure detection resource set may include RS indexes with quasi co-location (QCL)-TypeD configuration for the corresponding TCI state.

In some embodiments of the present application, the configuration information may also indicate two candidate resource sets, e.g., two NBI-RS sets, which are one to one association with the two failure detection resource sets. Each candidate resource set may include at least one of: at least one CSI-RS resource, and at least one SS (synchronization signal) block resource. For example, a candidate resource set indicated in the configuration information may be represented by a set of periodic CSI-RS resource configuration indexes, SS block resource indexes, or both of CSI-RS resource configuration indexes and SS block resource indexes, which can be configured by a high layer parameter candidateBeamRSList as defined in TS38.213.

Since each TRP is configured with a failure detection resource set, e.g., a BFD-RS set per-TRP, different failure detection resource set indexes can be used to distinguish different TRPs. Accordingly, a beam of a TRP can be represented by a failure detection resource from the associated failure detection resource set and a candidate beam of the TRP can be represented by a candidate resource from the associated candidate resource set. For example, a beam of a TRP, e.g., the first TRP 103*a* as shown in FIG. 1 can be represented by a failure detection resource in the first failure detection resource set, and a candidate beam the first TRP 103*a* can be represented by a candidate resource in the candidate resource set associated with the first failure detection resource set. Similarly, a beam of another TRP, e.g., the second TRP 103*b* as shown in FIG. 1 can be represented by a failure detection resource in the second failure detection resource set, and a candidate beam of the second TRP 103*b* can be represented by a candidate resource in the candidate resource set associated with the second failure detection resource set.

In some embodiments of the present application, the configuration information may also indicate a threshold for each failure detection resource set and each candidate resource set, e.g. a first threshold for a first failure detection resource set, a second threshold for a candidate resource set associated with the first failure detection resource set, a third threshold for a second failure detection resource set, and a fourth threshold for a candidate resource set associated with the second failure detection resource set etc. The threshold(s) respectively for a corresponding failure detection resource set and candidate resource set may be the same or different, and may be configured by a high layer signalling, e.g., a RRC signalling etc.

For example, the threshold configured for each failure detection resource set, e.g., the first threshold and the third threshold may be $Q_{out,LR}$ configured by a high layer parameter rlmInSyncOutOfSyncThreshold as defined in TS38.133. The threshold configured for each candidate resource set, e.g., the second threshold and the fourth threshold may be $Q_{in,LR}$ configured by a high layer parameter rsrp-ThresholdSSB as defined in TS38.133. For example, in the case that two failure detection resource sets and two candidate resource sets are configured, the configuration information may indicate a first threshold $Q_{1\text{-}1}$ for the first failure detection resource set and a second threshold $Q_{2\text{-}1}$ for the candidate resource set associated with the first failure detection resource set, and indicate a third threshold $Q_{1\text{-}2}$ for the second failure detection resource set and a fourth threshold $Q_{2\text{-}2}$ for the candidate resource set associated with the second failure detection resource set. The first threshold $Q_{1\text{-}1}$, the second threshold $Q_{2\text{-}1}$, the third threshold $Q_{1\text{-}2}$, and the fourth threshold $Q_{2\text{-}2}$ can be the same or different.

Persons skilled in the art should understand that the wording "first," and "second" etc. are only used for clear descriptions, which should not introduce unnecessary limitation.

However, in some other embodiments of the present application, the threshold(s) respectively for a corresponding failure detection resource set and candidate resource set may be predefined, instead of being configured.

After receiving the configuration information, the remote side, e.g., the UE 105 as shown in FIG. 1 may access the radio link quality of each failure detection resource set associated with a TRP. In the case that the radio link quality of all failure detection resources in a failure detection resource set is worse than a configured or predefined threshold, the TRP associated with the failure detection resource set is deemed as "failed" (e.g., all beams in the failure detection resource set failed or a beam failure for the corresponding TRP is detected). In some cases, only one failure detection resource set, e.g., a first failure detection resource set is failed, while in some cases both the two failure detection resource set are failed. The UE will prepare failure recovery information, e.g., a MAC CE at least indicating that a radio link quality of all failure detection resources in failed failure detection resource sets is worse than a threshold, which is also referred to as a MAC CE of TRP-specific BFR. Considering each failed failure detection resource set, the UE will also try to find a new beam (i.e., a RS) from the candidate resource set associated with the corresponding failed failure detection resource set for the failed TRP. Accordingly, besides reporting the beam failure of the failed TRP, the failure recovery information, e.g., the MAC CE of TRP-specific BFR may also report the corresponding new beam if it is found.

In step 204, the UE will transmit the failure recovery information, e.g., MAC CE of TRP-specific BFR in PUSCH transmission occasion(s) to the network side. Accordingly, in step 205, the failure recovery information reported by the remote side will be received in the network side. The network side may transmit a PDCCH for confirming the failure recovery information in various manners. For example, the network side may transmit a PDCCH with a DCI format scheduling a PUSCH transmission with a same hybrid automatic repeat request (HARQ) process number as that for the transmission of the PUSCH carrying a MAC CE to indicate the corresponding information of TRP-specific BFR and having a toggled new data indicator (NDI) field value.

For a CORESET with one or more activated TCI states, e.g., one activated TCI state or two activated TCI states in the cell, any TCI state activated for the CORESET is associated with a corresponding failure detection resource set of the two failure detection resource sets by a MAC CE or RRC signaling. In the case that one TCI state of the one or more activated TCI states is associated with the failed failure detection resource set, after a number of symbols, e.g., 28 symbols from the PDCCH transmission for confirming the failure recovery information, the network side may transmit PDCCHs in the CORESET based on the failure recovery information in step 207. Accordingly, the remote side, e.g., the UE 105 as shown in FIG. 1 will receive the PDCCH for confirming the failure recovery information. Then, in step 208, after a number of symbols from a last symbol of the received PDCCH for confirming the failure recovery information, the UE will monitor PDCCHs in the CORESET in the cell based on the failure recovery information. In some embodiments of the present application, the number of symbols from a last symbol of a PDCCH transmission for confirming the failure recovery information in the network side and the number of symbols from a last symbol of a PDCCH reception for confirming the failure recovery information in the remote side are the same.

Based on the above basic solutions, considering that various CORESETs may be configured in a multi-TRP scenario, a new beam may be found or not, or a found new beam may be used or not etc. factors, more details on some embodiments of the present application will be illustrated in view of various cases.

In an exemplary case (Case 1), only one of the two feature detection resource sets, e.g., a first feature detection resource set is failed and a new resource (or beam), e.g., a first reference signal can be found from the corresponding candidate resource set associated with the failed feature detection resource set in the UE. The UE will report failure recovery information, e.g., via a MAC CE to the network side, which indicates that only the radio link quality of all failure detection resources in the first failure detection resource set is worse than a first threshold, and a first reference signal with a radio link quality larger than or equal to a second threshold is found from a candidate resource set associated with the first failure detection resource set. After receiving the failure recovery information, the network side may transmit a PDCCH for confirming the failure recovery information to the remote side in various manners, e.g., a PDCCH with a DCI format scheduling a PUSCH transmission with a same HARQ process number as for the transmission of the PUSCH carrying a MAC CE to indicate the corresponding information of TRP-specific BFR and having a toggled NDI field value.

Then, for a CORESET with only one activated TCI state associated with the first failure detection resource set in the cell, the network side may transmit PDCCHs in the CORESET in the cell using the same antenna port quasi co-location parameters as the first reference signal, after a number of symbols, e.g., 28 (or another number) symbols from a last symbol of a transmitted PDCCH for confirming the failure recovery information. That may continue until the network side transmits a TCI state activation command for the CORESET in some embodiments of the present application, e.g., transmitting a MAC CE for activating TCI state(s) for the CORESET. Accordingly, the UE will monitor the PDCCHs in the CORESET in the cell using the same antenna port quasi co-location parameters as the first reference signal, after a number of symbols from a last symbol of a received PDCCH for confirming the failure recovery information. That may continue until the UE receives a TCI state activation command for the CORESET in some embodiments of the present application, e.g., receiving the MAC CE for activating TCI state(s) for the CORESET.

However, for a CORESET with two activated TCI states in the cell, wherein one activated TCI state is associated the first failure detection resource set, whether the new beam, i.e., the first reference signal can be used dependent on whether the first reference signal and another reference signal associated with the other TCI state can be received simultaneously. According to some embodiments of the present application, whether the first reference signal and another reference signal associated with the other TCI state can be received simultaneously is indicated by a group based beam report. When the first reference signal and another reference signal associated with the other TCI state can be received simultaneously, the network side will transmit PDCCHs in the CORESET in the cell using the same antenna port quasi co-location parameters as the first reference signal, after a number of symbols, e.g., 28 (or another number) symbols from a last symbol of a transmitted PDCCH for confirming the failure recovery information. That may continue until the network side transmits a TCI state activation command for the CORESET in some embodiments of the present application, e.g., transmitting a MAC CE for activating TCI state(s) for the CORESET. Accordingly, the UE will monitor the PDCCHs in the CORESET in the cell using the same antenna port quasi co-location parameters as the first reference signal, after a number of symbols from a last symbol of a received PDCCH for confirming the failure recovery information. That may continue until the UE receives a TCI state activation command for the CORESET in some embodiments of the present application, e.g., receiving the MAC CE for activating TCI state(s) for the CORESET. When the first reference signal and another reference signal associated with the other TCI state cannot be received simultaneously, the network side will transmit PDCCHs in the CORESET in the cell using the same antenna port quasi co-location parameters as the other TCI state after a number of symbols, e.g., 28 (or another number) symbols from a last symbol of a transmitted PDCCH for confirming the failure recovery information. That may continue until the network side transmits a TCI state activation command for the CORESET in some embodiments of the present application. Accordingly, the UE will monitor the PDCCHs in the CORESET in the cell using the same antenna port quasi co-location parameters as the other TCI state after a number of symbols from a last symbol of a received PDCCH for confirming the failure recovery information. That may continue until the UE receives a TCI state activation command for the CORESET in some embodiments of the present application.

Herein (throughout the specification), “using (the) same antenna port quasi co-location parameters as a reference signal” or “using (the) same antenna port quasi co-location parameters as a TCI state” means using a beam represented by the reference signal or a beam represented by the TCI state.

Figure 3:
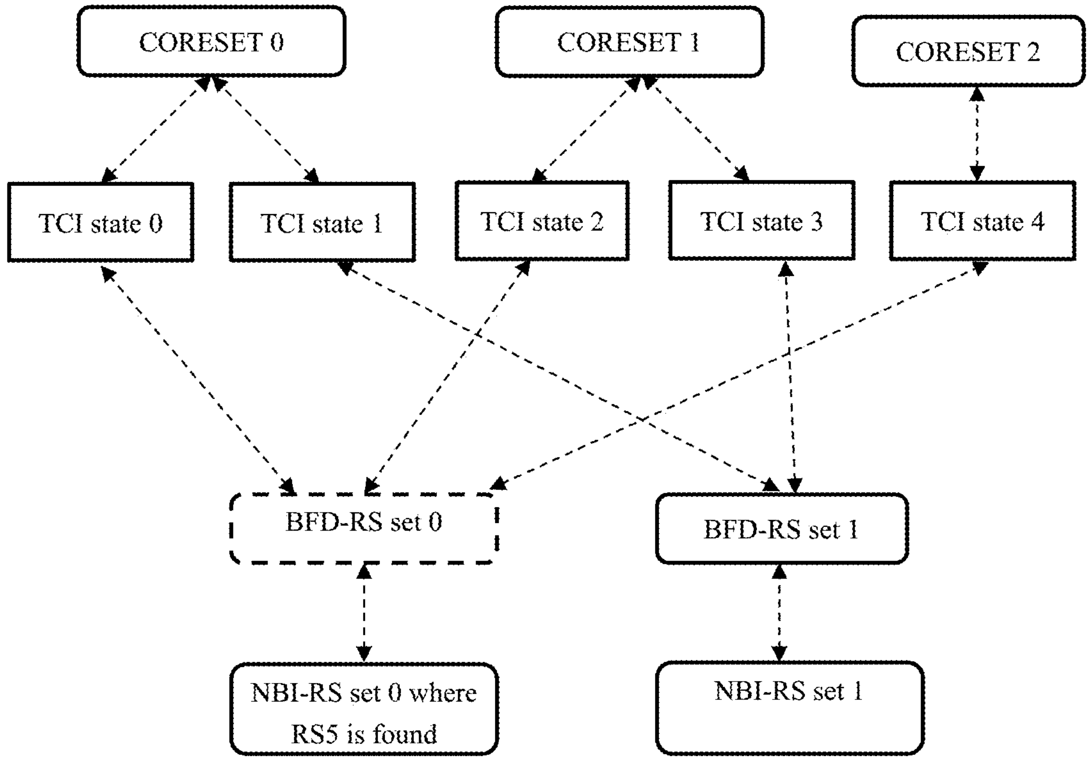
FIG. 3 illustrates an exemplary diagram of a beam determination in a multi-TRP scenario in Case 1 according to some embodiments of the present application.

FIG. 3 illustrates an exemplary diagram of a beam determination in a multi-TRP scenario in Case 1 according to some embodiments of the present application.

As shown in FIG. 3, two failure detection resource sets, e.g., BFD-RS set 0 and BFD-RS set 1 are explicitly or implicitly configured for TRP-specific BFR in a cell. Meanwhile, two candidate resource sets, e.g., NBI-RS set 0 and NBI-RS set 1 are configured, wherein NBI-RS set 0 is associated with BFD-RS set 0 and NBI-RS set 1 is associated with BFD-RS set 1. There are multiple CORESETs, e.g., CORESET 0, CORESET 1 and CORESET 2 in the cell. Two TCI states, e.g., TCI state 0 and TCI state 1 are activated for CORESET 0, other two TCI states, e.g., TCI state 2 and TCI state 3 are activated for CORESET 1, and only one TCI state, e.g., TCI state 4 is activated for CORESET 2. Wherein, TCI state 0, TCI state 2 and TCI state 4 are associated with BFD-RS set 0, and TCI state 1 and TCI state 3 are associated with BFD-RS set 1. It is assumed that the failure detection information reported by the UE indicates that: BFD-RS set 0 is failed, and a reference signal, e.g., RS 5 with a radio link quality larger than or equal to a corresponding threshold is found from NBI-RS set 0. In addition, according to a group based beam report, RS 5 and the reference signal associated with TCI state 1 can be received simultaneously.

Then, for CORESET 2 with only TCI state 4, the network side may transmit PDCCHs in CORESET 2 using the same antenna port quasi co-location parameters as RS5, after a number of symbols from a last symbol of a PDCCH transmission for confirming the failure recovery information, which may continue until the network side transmits a MAC CE for activating TCI state(s) for CORESET 2. Accordingly, after a number of symbols from a last symbol of a PDCCH reception for confirming the failure recovery information, the UE will monitor the PDCCHs in CORESET 2 in the cell using the same antenna port quasi co-location parameters as RS5, which may continue until the UE receives a MAC CE for activating TCI state(s) for CORESET 2.

For CORESET 0 with TCI state 0 and TCI state 1 in the cell, since RS 5 and the reference signal associated with TCI state 1 can be received simultaneously, the network side will transmit PDCCHs in CORESET 0 in the cell using the same antenna port quasi co-location parameters as RS 5, after a number of symbols from a last symbol of a PDCCH transmission for confirming the failure recovery information. Accordingly, the UE will monitor the PDCCHs in CORESET 0 in the cell using the same antenna port quasi co-location parameters as RS 5, after a number of symbols from a last symbol of a PDCCH reception for confirming the failure recovery information.

While for CORESET 1 with TCI state 2 and TCI state 3, since RS 5 and the reference signal associated with TCI state 3 cannot be received simultaneously, the network side will transmit PDCCHs in CORESET 1 in the cell using the same antenna port quasi co-location parameters as TCI state 3, after a number of symbols from a last symbol of a PDCCH transmission for confirming the failure recovery information. Accordingly, the UE will monitor the PDCCHs in CORESET 1 in the cell using the same antenna port quasi co-location parameters as TCI state 3, after a number of symbols from a last symbol of a PDCCH reception for confirming the failure recovery information.

In another exemplary case (Case 2), both the two feature detection resource sets, e.g., a first and second feature detection resource sets are failed and two new resources (or beams), e.g., a first and second reference signals can be found from the respective candidate resource sets associated with the two feature detection resource sets in the UE. The UE will report failure recovery information, e.g., via a MAC CE to the network side, which indicates that: the radio link quality of all failure detection resources in the first failure detection resource set is worse than a first threshold, the radio link quality of all failure detection resources in a second failure detection resource set of the two failure detection resource sets is worse than a third threshold, a first reference signal with a radio link quality larger than or equal to a second threshold is found from a candidate resource sets associated with the first failure detection resource set, and a second reference signal with a radio link quality larger than or equal to a fourth threshold is found from another candidate resource set associated with the second failure detection resource sets. After receiving the failure recovery information, the network side may transmit a PDCCH for confirming the failure recovery information to the remote side in various manners, e.g., a PDCCH with a DCI format scheduling a PUSCH transmission with a same HARQ process number as for the transmission of the PUSCH carrying a MAC CE to indicate the corresponding information of TRP-specific BFR and having a toggled NDI field value.

Then, for a CORESET with only one activated TCI state associated with one failed failure detection resource set, e.g., associated with the first failure detection resource set in the cell, the network side may transmit PDCCHs in the CORESET in the cell using the same antenna port quasi co-location parameters as the first reference signal after a number of symbols, e.g., 28 (or another number) symbols from a last symbol of the transmitted PDCCH for confirming the failure recovery information. That may continue until the network side transmits a TCI state activation command for the CORESET in some embodiments of the present application, e.g., transmitting a MAC CE for activating TCI state(s) for the CORESET. Accordingly, the UE will monitor the PDCCHs in the CORESET in the cell using the same antenna port quasi co-location parameters as the first reference signal, after a number of symbols from a last symbol of the received PDCCH for confirming the failure recovery information. That may continue until the UE receives a TCI state activation command for the CORESET in some embodiments of the present application, e.g., receiving the MAC CE for activating TCI state(s) for the CORESET.

However, for a CORESET with two activated TCI states in the cell, wherein one activated TCI state is associated the first failure detection resource set and the other activated TCI state is associated the second failure detection resource set, whether the new beams, i.e., the first and second reference signals can be used dependent on whether the first reference signal and second reference signal can be received simultaneously. According to some embodiments of the present application, whether the first reference signal and the second reference signal can be received simultaneously is indicated by a group based beam report. When the first reference signal and second reference signal can be received simultaneously, the network side will transmit PDCCHs in the CORESET in the cell using the same antenna port quasi co-location parameters as the first and second reference signals, after a number of symbols, e.g., 28 (or another number) symbols from a last symbol of a PDCCH transmission for confirming the failure recovery information. That may continue until the network side transmits a TCI state activation command for the CORESET. Accordingly, the UE will monitor the PDCCHs in the CORESET in the cell using the same antenna port quasi co-location parameters as the first and second reference signals, after a number of symbols from a last symbol of a received PDCCH for confirming the failure recovery information. That may continue until the UE receives a TCI state activation command for the CORESET. When the first reference signal and second reference signal cannot be received simultaneously, the network side will transmit PDCCHs in the CORESET in the cell using the same antenna port quasi co-location parameters as one of the first and second reference signals after a number of symbols, e.g., 28 (or another number) symbols from a last symbol of a transmitted PDCCH for confirming the failure recovery information. That may continue until the network side transmits a TCI state activation command for the CORESET. Accordingly, the UE will monitor the PDCCHs in the CORESET in the cell using the same antenna port quasi co-location parameters as one of the first and second reference signal after a number of symbols from a last symbol of a received PDCCH for confirming the failure recovery information. That may continue until the UE receives a TCI state activation command for the CORESET.

Figure 4:
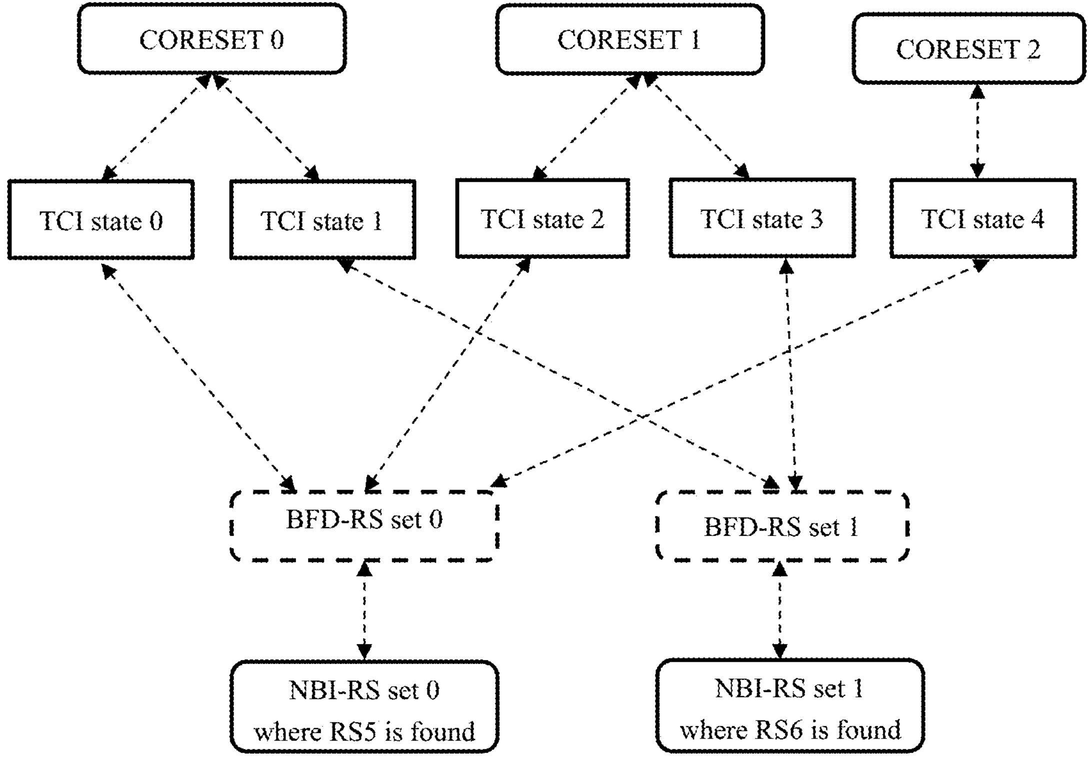
FIG. 4 illustrates an exemplary diagram of a beam determination in a multi-TRP scenario in Case 2 according to some embodiments of the present application.

FIG. 4 illustrates an exemplary diagram of a beam determination in a multi-TRP scenario in Case 2 according to some embodiments of the present application.

As shown in FIG. 4, two failure detection resource sets, e.g., BFD-RS set 0 and BFD-RS set 1 are explicitly or implicitly configured for TRP-specific BFR in a cell. Meanwhile, two candidate resource sets, e.g., NBI-RS set 0 and NBI-RS set 1 are configured, wherein NBI-RS set 0 is associated with BFD-RS set 0 and NBI-RS set 1 is associated with BFD-RS set 1. There are multiple CORESETs, e.g., CORESET 0, CORESET 1 and CORESET 2 in the cell. Two TCI states, e.g., TCI state 0 and TCI state 1 are activated for CORESET 0, other two TCI states, e.g., TCI state 2 and TCI state 3 are activated for CORESET 1, and only one TCI state, e.g., TCI state 4 is activated for CORESET 2. Wherein, TCI state 0, TCI state 2 and TCI state 4 are associated with BFD-RS set 0, and TCI state 1 and TCI state 3 are associated with BFD-RS set 1. It is assumed that the failure detection information reported by the UE indicates that: both BFD-RS set 0 and BFD-RS set 1 are failed, and two reference signals, e.g., RS 5 with a radio link quality larger than or equal to a corresponding threshold being found from NBI-RS set 0 and RS 6 with a radio link quality larger than or equal to a corresponding threshold being found from NBI-RS set 1. In addition, according to a group based beam report, RS 5 and RS 6 can be received simultaneously.

Then, for CORESET 2 with only TCI state 4, the network side may transmit PDCCHs in CORESET 2 using the same antenna port quasi co-location parameters as RS5, after a number of symbols from a last symbol of a transmitted PDCCH for confirming the failure recovery information, which may continue until the network side transmits a MAC CE for activating TCI state(s) for CORESET 2. Accordingly, after a number of symbols from a last symbol of a received PDCCH for confirming the failure recovery information, the UE will monitor the PDCCHs in CORESET 2 in the cell using same antenna port quasi co-location parameters as RS5, which may continue until the UE receives a MAC CE for activating TCI state(s) for CORESET 2.

For CORESET 0 with TCI state 0 and TCI state 1 and CORESET 1 with TCI state 2 and TCI state 3 in the cell, since RS 5 and RS 6 can be received simultaneously, the network side will transmit PDCCHs in CORESET 0 and CORESET 1 in the cell using the same antenna port quasi co-location parameters as RS 5 and RS 6, after a number of symbols from a last symbol of a PDCCH transmission for confirming the failure recovery information. Accordingly, the UE will monitor the PDCCHs in CORESET 0 and CORESET 1 in the cell using the same antenna port quasi co-location parameters as RS 5 and 6, after a number of symbols from a last symbol of a PDCCH reception for confirming the failure recovery information.

However, if the group based beam report indicates that RS 5 and RS 6 cannot be received simultaneously, the network side will transmit PDCCHs in CORESET 0 and CORESET 1 in the cell using the same antenna port quasi co-location parameters as RS 5 or RS 6, after a number of symbols from a last symbol of a PDCCH transmission for confirming the failure recovery information. Accordingly, the UE will monitor the PDCCHs in CORESET 0 and CORESET 1 in the cell using the same antenna port quasi co-location parameters as RS 5 or RS 6, after a number of symbols from a last symbol of a PDCCH reception for confirming the failure recovery information.

In yet another exemplary case (Case 3), both the two feature detection resource sets, e.g., the first and second feature detection resource sets are failed, while only one new resources (or beams) can be found from a corresponding candidate resource sets associated with one of the two feature detection resource sets in the UE, a first reference signal found from a candidate resource set associated with the first feature detection resource set. The UE will report failure recovery information, e.g., via a MAC CE to the network side, which indicates that: the radio link quality of all failure detection resources in the first failure detection resource set is worse than a first threshold, the radio link quality of all failure detection resources in a second failure detection resource set of the two failure detection resource sets is worse than a third threshold, and only a first reference signal with a radio link quality larger than or equal to a second threshold is found from a candidate resource sets associated with the first failure detection resource set. After receiving the failure recovery information, the network side may transmit a PDCCH for confirming the failure recovery information to the remote side in various manners, e.g., a PDCCH transmission with a DCI format scheduling a PUSCH transmission with a same HARQ process number as for the transmission of the PUSCH carrying a MAC CE to indicate the corresponding information of TRP-specific BFR and having a toggled NDI field value.

According to some embodiments of the present application, the network side will fall back to the single TRP transmission mode, and the TCI state of any CORESET in the cell is updated as the new beam for transmitting or monitoring the PDCCHs in the CORESET. Thus, the network side will transmit PDCCHs in any CORESET in the cell using the same antenna port quasi co-location parameters as the first reference signal, after a number of symbols, e.g., 28 (or another number) symbols from a last symbol of a PDCCH transmission for confirming the failure recovery information. That may continue until the network side transmits a TCI state activation command for the CORESET in some embodiments of the present application, e.g., transmitting a MAC CE for activating TCI state(s) for the CORESET. Accordingly, the UE will monitor the PDCCHs in any CORESET in the cell using same antenna port quasi co-location parameters as the first reference signal, after a number of symbols from a last symbol of a received PDCCH for confirming the failure recovery information. That may continue until the UE receives a TCI state activation command for the CORESET in some embodiments of the present application, e.g., receiving the MAC CE for activating TCI state(s) for the CORESET.

According to some embodiments of the present application, the network side will still operate in the multi-TRP transmission mode.

Then, for a CORESET with only one activated TCI state in the cell, the network side may transmit PDCCHs in the CORESET using the same antenna port quasi co-location parameters as the first reference signal, after a number of symbols, e.g., 28 (or another number) symbols from a last symbol of a PDCCH transmission for confirming the failure recovery information. That may continue until the network side transmits a TCI state activation command for the CORESET in some embodiments of the present application. Accordingly, the UE will monitor the PDCCHs in the CORESET in the cell using the same antenna port quasi co-location parameters as the first reference signal, after a number of symbols from a last symbol of a received PDCCH for confirming the failure recovery information. That may continue until the UE receives a TCI state activation command for the CORESET in some embodiments of the present application, e.g., receiving a MAC CE for activating TCI state(s) for the CORESET. For a CORESET with only one activated TCI state associated with the first failure detection resource set, since the new beam is found from the candidate resource set associated with the first failure detection set, the TCI state of the CORESET will be updated and the CORESET will be recovered accordingly.

For a CORESET with two activated TCI states in the cell, since only the first reference signal is found, the network side may transmit PDCCHs in the CORESET using the same antenna port quasi co-location parameters as the first reference signal, after a number of symbols, e.g., 28 (or another number) symbols from a last symbol of a PDCCH transmission for confirming the failure recovery information. That may continue until the network side transmits a TCI state activation command for the CORESET in some embodiments of the present application. Accordingly, the UE will monitor the PDCCHs in the CORESET in the cell using the same antenna port quasi co-location parameters as the first reference signal, after a number of symbols from a last symbol of a received PDCCH for confirming the failure recovery information. That may continue until the UE receives a TCI state activation command for the CORESET in some embodiments of the present application, e.g., receiving a MAC CE for activating TCI state(s) for the CORESET.

Figure 5:
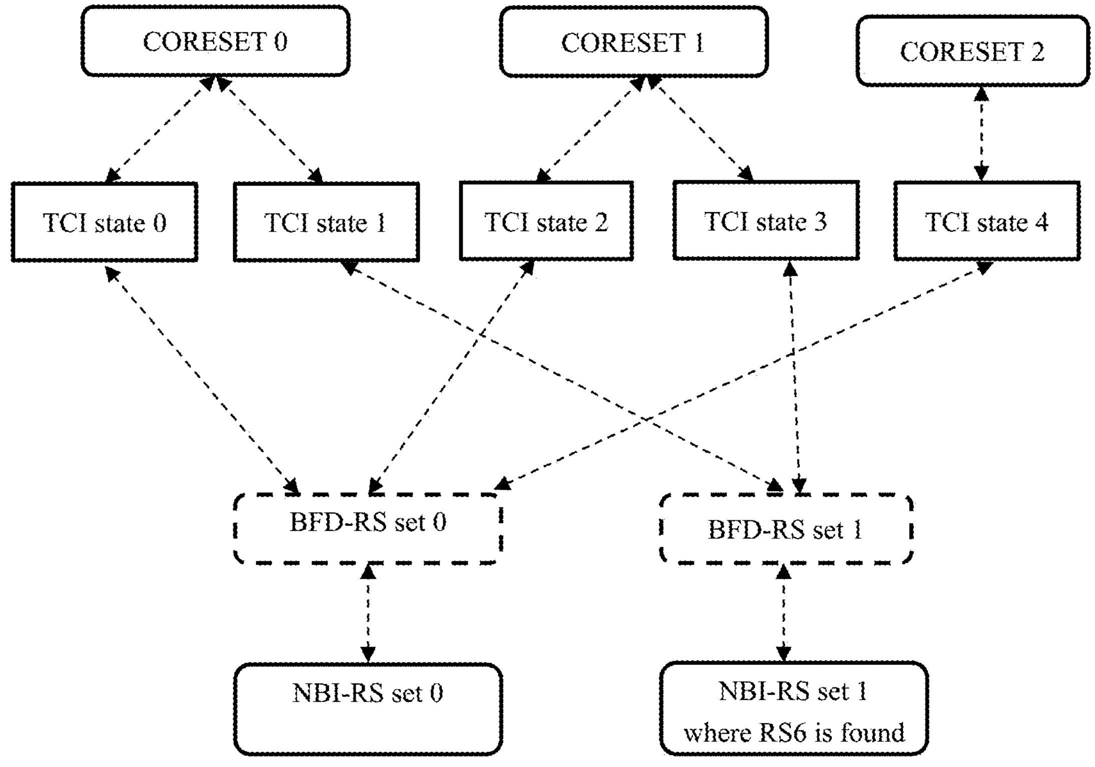
FIG. 5 illustrates an exemplary diagram of a beam determination in a multi-TRP scenario in Case 3 according to some embodiments of the present application.

FIG. 5 illustrates an exemplary diagram of a beam determination in a multi-TRP scenario in Case 3 according to some embodiments of the present application.

As shown in FIG. 5, two failure detection resource sets, e.g., BFD-RS set 0 and BFD-RS set 1 are explicitly or implicitly configured for TRP-specific BFR in a cell. Meanwhile, two candidate resource sets, e.g., NBI-RS set 0 and NBI-RS set 1 are configured, wherein NBI-RS set 0 is associated with BFD-RS set 0 and NBI-RS set 1 is associated with BFD-RS set 1. There are multiple CORESETs, e.g., CORESET 0, CORESET 1 and CORESET 2 in the cell. Two TCI states, e.g., TCI state 0 and TCI state 1 are activated for CORESET 0, other two TCI states, e.g., TCI state 2 and TCI state 3 are activated for CORESET 1, and only one TCI state, e.g., TCI state 4 is activated for CORESET 2. Wherein, TCI state 0, TCI state 2 and TCI state 4 are associated with BFD-RS set 0, and TCI state 1 and TCI state 3 are associated with BFD-RS set 1. It is assumed that the failure detection information reported by the UE indicates that: both BFD-RS set 0 and BFD-RS set 1 are failed, and only a reference signal, e.g., RS 5 with a radio link quality larger than or equal to a corresponding threshold is found from NBI-RS set 0.

According to some embodiments of the present application, the network side may fall back the single TRP transmission mode, and the network side will transmit PDCCHs in any CORSET in the cell, e.g., CORESETs 0-2 using the same antenna port quasi co-location parameters as RS5, after a number of symbols from a last symbol of a transmitted PDCCH for confirming the failure recovery information. Accordingly, after a number of symbols from a last symbol of a received PDCCH for confirming the failure recovery information, the UE will monitor the PDCCHs in any CORSET in the cell, e.g., CORESETs 0-2 using the same antenna port quasi co-location parameters as RS5.

According to some other embodiments of the present application, the network side still operates in the multi-TRP transmission mode. For CORESETs 0 to 2, the network side will transmit PDCCHs in them in the cell using the same antenna port quasi co-location parameters as RS 5, after a number of symbols from a last symbol of a PDCCH transmission for confirming the failure recovery information. Accordingly, the UE will monitor the PDCCHs in CORESETs 0 to 2 in the cell using the same antenna port quasi co-location parameters as RS 5, after a number of symbols from a last symbol of a PDCCH reception for confirming the failure recovery information. Since only TCI state 4 associated with BFD-RS set 0 is activated for CORESET 2, the beam of CORESET 2 can be updated and thus CORESET 2 will be recovered.

In yet another case, when only one of the two failure detection reference sets is deemed as "failed" while no new beam can be found from the candidate resource set associated with the failed failure detection reference set, the TCI state associated with the failed BFD-RS set cannot be updated. Then, for a CORESET with only one activated TCI state associated with the failed BFD-RS set, the network will stop transmitting PDCCHs in the CORESET, and the UE will stop monitoring the PDCCHs in the CORESET. For a CORESET with two activated TCI states, wherein one TCI state of the two TCI states is associated with the failed failure detection resource set, the network side will transmit PDCCHs in the CORESET in the cell using the same antenna port quasi co-location parameters as the TCI state associated with the non-failed failure detection resource set after a number of symbols from a last symbol of a transmitted PDCCH for confirming the failure recovery information. Accordingly, the UE will monitor the PDCCHs in the CORESET the cell using the same antenna port quasi co-location parameters as the TCI state associated with the non-failed failure detection resource set after a number of symbols from a last symbol of a received PDCCH for confirming the failure recovery information.

In yet another case, when both the two failure detection reference sets are deemed as "failed" while no new beam can be found from any candidate resource set associated with the two failed failure detection reference set, the network side will stop transmitting PDCCHs in all the CORESETs in the cell. The UE will stop monitoring all the CORESETs in the cell and fallback to the BFR based the RACH initial access as specified in R15.

Figure 6:
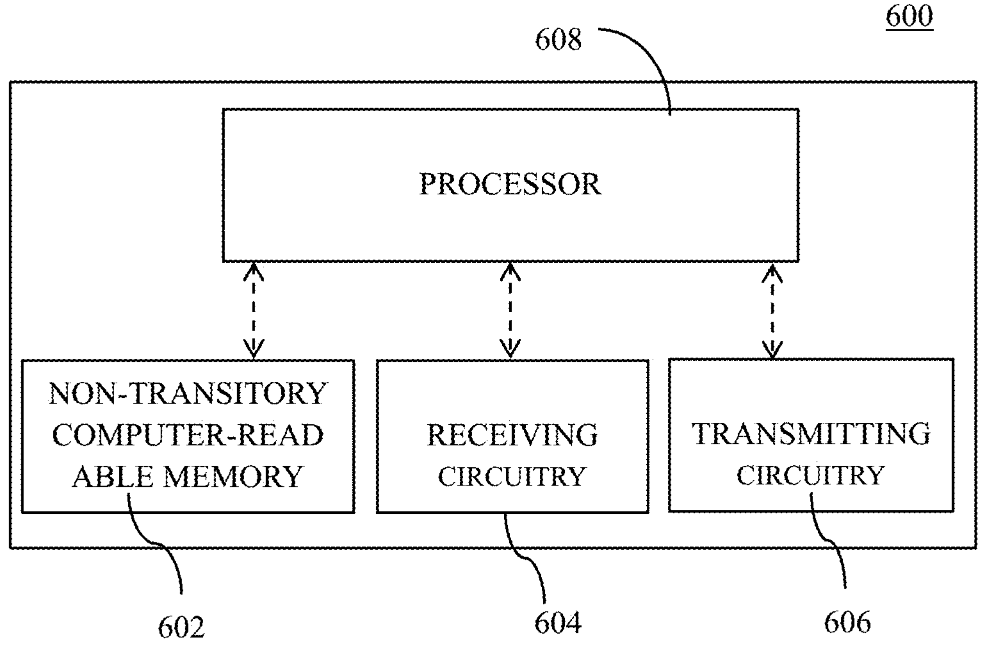
FIG. 6 illustrates a simplified block diagram of an apparatus for beam determination according to some embodiments of the present application.

Embodiments of the present application also propose an apparatus for beam determination. For example, FIG. 6 illustrates a block diagram of an apparatus 600 for beam determination according to some embodiments of the present application. The apparatus 600 may be a BS 101, a TRP 103 or a UE 105 (for example, UE 105*a*, UE 105*b*, or UE 105*c*) as shown in FIG. 1.

As shown in FIG. 6, the apparatus 600 may include at least one non-transitory computer-readable medium 602, at least one receiving circuitry 604, at least one transmitting circuitry 606, and at least one processor 608 coupled to the non-transitory computer-readable medium 602, the receiving circuitry 604 and the transmitting circuitry 606. The apparatus 600 may be a network side apparatus (e.g., a BS) configured to perform a method illustrated in any one of FIG. 2 and the like, or a remote unit (e.g., a UE) configured to perform a method illustrated in any one of FIG. 2 or the like.

Although in this figure, elements such as the at least one processor 608, transmitting circuitry 606, and receiving circuitry 604 are described in the singular, the plural is contemplated unless a limitation to the singular is explicitly stated. In some embodiments of the present application, the receiving circuitry 604 and the transmitting circuitry 606 can be combined into a single device, such as a transceiver. In certain embodiments of the present application, the apparatus 600 may further include an input device, a memory, and/or other components.

For example, in some embodiments of the present application, the non-transitory computer-readable medium 602 may have stored thereon computer-executable instructions to cause a processor to implement the method with respect to the UE as described above. For example, the computer-executable instructions, when executed, cause the processor 608 interacting with receiving circuitry 604 and transmitting circuitry 606, so as to perform the steps with respect to the UE depicted in FIG. 2.

In some embodiments of the present application, the non-transitory computer-readable medium 602 may have stored thereon computer-executable instructions to cause a processor to implement the method with respect to the BS as described above. For example, the computer-executable instructions, when executed, cause the processor 608 interacting with receiving circuitry 604 and transmitting circuitry 606, so as to perform the steps with respect to the BS depicted in FIG. 2.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for beam determination, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A User Equipment (UE) for wireless communications, comprising:

at least one memory; and at least one processor coupled with the at least one memory and configured to cause the UE to:

receive configuration information indicating at least two failure detection resource sets in a cell;

transmit failure recovery information indicating at least a radio link quality of all failure detection resources in a first failure detection resource set of the two failure detection resource sets is worse than a first threshold; and monitor physical downlink control channels (PDCCHs) in a control resource set (CORESET) in the cell based on the failure recovery information, wherein one or more transmission configuration indicator (TCI) states are activated for the CORESET and one TCI state of the one or more TCI states is associated with the first failure detection resource set, after a number of symbols from a last symbol of a received PDCCH for confirming the failure recovery information.

2. The UE of claim 1, wherein any TCI state activated for the CORESET is associated with a corresponding failure detection resource set of the two failure detection resource sets by a media access control (MAC) control element (CE) or radio resource control (RRC) signaling.

3. The UE of claim 1, wherein the processor is further configured to cause the UE to:

when the failure recovery information indicates that only the radio link quality of all failure detection resources in the first failure detection resource set is worse than a first threshold and a first reference signal with a radio link quality larger than or equal to a second threshold is found from a candidate resource set associated with the first failure detection resource set, and when only the one TCI state associated with the first failure detection resource set is activated for the CORESET, monitor the PDCCHs in the CORESET in the cell using same antenna port quasi co-location parameters as the first reference signal, after a number of symbols from a last symbol of a received PDCCH for confirming the failure recovery information.

4. The UE of claim 1, wherein the one or more TCI states comprise another TCI state associated with a second failure detection resource set of the two failure detection resource sets, the processor is further configured to cause the UE to:

when the failure recovery information indicates that only the radio link quality of all failure detection resources in the first failure detection resource set is worse than a first threshold and a first reference signal with a radio link quality larger than or equal to a second threshold is found from a candidate resource set associated with the first failure detection resource set, and after a number of symbols from a last symbol of a received PDCCH for confirming the failure recovery information, monitor the PDCCHs in the CORESET in the cell using same antenna port quasi co-location parameters as the first reference signal and the other TCI state in the case that the first reference signal and another reference signal associated with the other TCI state can be received simultaneously.

5. The UE of claim 1, wherein the processor is further configured to cause the UE to:

when the failure recovery information also indicates that a radio link quality of all failure detection resources in a second failure detection resource set of the two failure detection resource sets is worse than a third threshold, a first reference signal with a radio link quality larger than or equal to a second threshold is found from a candidate resource sets associated with the first failure detection resource set, and a second reference signal with a radio link quality larger than or equal to a fourth threshold is found from another candidate resource set associated with the second failure detection resource sets, and when only the one TCI state associated with the first failure detection resource set is activated for the CORESET, monitor the PDCCHs in the CORESET in the cell using same antenna port quasi co-location parameters as the first reference signal, after a number of symbols from a last symbol of a received PDCCH for confirming the failure recovery information.

6. The UE of claim 1, wherein the one or more TCI states comprise another TCI state associated with a second failure detection resource set of the two failure detection resource sets, the processor is further configured to cause the UE to:

when the failure recovery information also indicates that the radio link quality of all failure detection resources in a second failure detection resource set of the two failure detection resource sets is worse than a third threshold, a first reference signal with a radio link quality larger than or equal to a second threshold is found from a candidate resource sets associated with the first failure detection resource set, and a second reference signal with a radio link quality larger than or equal to a fourth threshold is found from another candidate resource set associated with the second failure detection resource set, and after a number of symbols from a last symbol of a received PDCCH for confirming the failure recovery information, monitor the PDCCHs in the CORESET in the cell using same antenna port quasi co-location parameters as the first reference signal and the second reference signal in the case that the first reference signal and the second reference signal can be received simultaneously.

7. The UE of claim 1, wherein the processor is further configured to cause the UE to:

when the failure recovery information indicates that the radio link quality of all failure detection resources in a second failure detection resource set of the two failure detection resource sets is worse than a third threshold and only one reference signal with a radio link quality larger than or equal to a corresponding threshold is found from a candidate resource set associated with one of the two failure detection resource sets, monitor the PDCCHs in any CORESET in the cell using same antenna port quasi co-location parameters as the one reference signal, after a number of symbols from a last symbol of a received PDCCH for confirming the failure recovery information.

8. The method of claim 1, wherein the processor is further configured to cause the UE to:

when the failure recovery information also indicates that the radio link quality of all failure detection resources in a second failure detection resource set of the two failure detection resource sets is worse than a third threshold and only a first reference signal with a radio link quality larger than or equal to a second threshold is found from a candidate resource set associated with the first failure detection resource set, monitor the PDCCHs in the CORESET in the cell using same antenna port quasi co-location parameters as the first reference signal, after a number of symbols from a last symbol of a received PDCCH for confirming the failure recovery information.

9. A processor for wireless communications, comprising:

at least one controller coupled with at least one memory and configured to cause the processor to:

receive configuration information indicating at least two failure detection resource sets in a cell;

transmit failure recovery information indicating at least a radio link quality of all failure detection resources in a first failure detection resource set of the two failure detection resource sets is worse than a first threshold; and monitor physical downlink control channels (PDCCHs) in a control resource set (CORESET) in the cell based on the failure recovery information, wherein one or more transmission configuration indicator (TCI) states are activated for the CORESET and one TCI state of the one or more TCI states is associated with the first failure detection resource set, after a number of symbols from a last symbol of a received PDCCH for confirming the failure recovery information.

10. The processor of claim 9, wherein any TCI state activated for the CORESET is associated with a corresponding failure detection resource set of the two failure detection resource sets by a media access control (MAC) control element (CE) or radio resource control (RRC) signaling.

11. The processor of claim 9, wherein the controller is further configured to cause the processor to:

when the failure recovery information indicates that only the radio link quality of all failure detection resources in the first failure detection resource set is worse than a first threshold and a first reference signal with a radio link quality larger than or equal to a second threshold is found from a candidate resource set associated with the first failure detection resource set, and when only the one TCI state associated with the first failure detection resource set is activated for the CORESET, monitor the PDCCHs in the CORESET in the cell using same antenna port quasi co-location parameters as the first reference signal, after a number of symbols from a last symbol of a received PDCCH for confirming the failure recovery information.

12. A network entity for wireless communications, comprising:

at least one memory; and at least one processor coupled with the at least one memory and configured to cause the network entity to:

transmit configuration information indicating at least two failure detection resource sets in a cell;

receive failure recovery information indicating at least a radio link quality of all failure detection resources in a first failure detection resource set of the two failure detection resource sets is worse than a first threshold; and transmit physical downlink control channels (PDCCH) s in a control resource set (CORESET) in the cell based on the failure recovery information, wherein one or more transmission configuration indicator (TCI) states are activated for the CORESET and one TCI state of the one or more TCI states is associated with the first failure detection resource set, after a number of symbols from a last symbol of a transmitted PDCCH for confirming the failure recovery information.

13. The network entity of claim 12, wherein the processor is configured to cause the network entity to:

when the failure recovery information indicates that only the radio link quality of all failure detection resources in the first failure detection resource set is worse than a first threshold and a first reference signal with a radio link quality larger than or equal to a second threshold is found from a candidate resource set associated with the first failure detection resource set is found, and when only the one TCI state associated with the first failure detection resource set is activated for the CORESET;

transmit the PDCCHs in the CORESET in the cell using same antenna port quasi co-location parameters as the first reference signal, after a number of symbols from a last symbol of a transmitted PDCCH for confirming the failure recovery information.

14. The network entity of claim 12, wherein the processor is configured to cause the network entity to:

when the failure recovery information also indicates that a radio link quality of all failure detection resources in a second failure detection resource set of the two failure detection resource sets is worse than a third threshold, a first reference signal with a radio link quality larger than or equal to a second threshold is found from a candidate resource sets associated with the first failure detection resource set, and a second reference signal with a radio link quality larger than or equal to a fourth threshold is found from another candidate resource set associated with the second failure detection resource set, and when only the one TCI state associated with the first failure detection resource set is activated for the CORESET, transmit the PDCCHs in the CORESET in the cell using same antenna port quasi co-location parameters as the first reference signal, after a number of symbols from a last symbol of a transmitted PDCCH for confirming the failure recovery information.

15. The network entity of claim 12, wherein the one or more TCI states comprise another TCI state associated with a second failure detection resource set of the two failure detection resource sets, the processor is configured to cause the network entity to:

when the failure recovery information also indicates that the radio link quality of all failure detection resources in a second failure detection resource set of the two failure detection resource sets is worse than a third threshold, a first reference signal with a radio link quality larger than or equal to a second threshold is found from a candidate resource sets associated with the first failure detection resource set, and a second reference signal with a radio link quality larger than or equal to a fourth threshold is found from another candidate resource set associated with the second failure detection resource set, after a number of symbols from a last symbol of a transmitted PDCCH for confirming the failure recovery information, transmit the PDCCHs in the CORESET in the cell using same antenna port quasi co-location parameters as the first reference signal and the second reference signal in the case that the first reference signal and the second reference signal can be received simultaneously.

16. The network entity of claim 12, wherein the processor is configured to cause the network entity to:

when the failure recovery information also indicates that the radio link quality of all failure detection resources in a second failure detection resource set of the two failure detection resource sets is worse than a third threshold and only one reference signal with a radio link quality larger than or equal to a corresponding threshold is found from a candidate resource set associated with one of the two failure detection resource sets, transmit the PDCCHs in any CORESET in the cell using same antenna port quasi co-location parameters as the one reference signal, after a number of symbols from a last symbol of a transmitted PDCCH for confirming the failure recovery information.

17. The network of claim 12, wherein the processor is configured to cause the network entity to:

when the failure recovery information indicates that the radio link quality of all failure detection resources in a second failure detection resource set of the two failure detection resource sets is worse than a third threshold and only a first reference signal with a radio link quality larger than or equal to a second threshold is found from a candidate resource set associated with the first failure detection resource set, transmit the PDCCHs in the CORESET in the cell using same antenna port quasi co-location parameters as the first reference signal, after a number of symbols from a last symbol of a transmitted PDCCH for confirming the failure recovery information.

18. A processor for wireless communications, comprising:

at least one controller coupled with at least one memory and configured to cause the processor to:

transmit configuration information indicating at least two failure detection resource sets in a cell;

receive failure recovery information indicating at least a radio link quality of all failure detection resources in a first failure detection resource set of the two failure detection resource sets is worse than a first threshold; and transmit physical downlink control channels (PDCCH) s in a control resource set (CORESET) in the cell based on the failure recovery information, wherein one or more transmission configuration indicator (TCI) states are activated for the CORESET and one TCI state of the one or more TCI states is associated with the first failure detection resource set, after a number of symbols from a last symbol of a transmitted PDCCH for confirming the failure recovery information.

19. The processor of claim 18, wherein the controller is configured to cause the processor to:

when the failure recovery information indicates that only the radio link quality of all failure detection resources in the first failure detection resource set is worse than a first threshold and a first reference signal with a radio link quality larger than or equal to a second threshold is found from a candidate resource set associated with the first failure detection resource set is found, and when only the one TCI state associated with the first failure detection resource set is activated for the CORESET;

transmit the PDCCHs in the CORESET in the cell using same antenna port quasi co-location parameters as the first reference signal, after a number of symbols from a last symbol of a transmitted PDCCH for confirming the failure recovery information.

20. The processor of claim 18, wherein the controller is configured to cause the processor to:

when the failure recovery information also indicates that a radio link quality of all failure detection resources in a second failure detection resource set of the two failure detection resource sets is worse than a third threshold, a first reference signal with a radio link quality larger than or equal to a second threshold is found from a candidate resource sets associated with the first failure detection resource set, and a second reference signal with a radio link quality larger than or equal to a fourth threshold is found from another candidate resource set associated with the second failure detection resource set, and when only the one TCI state associated with the first failure detection resource set is activated for the CORESET, transmit the PDCCHs in the CORESET in the cell using same antenna port quasi co-location parameters as the first reference signal, after a number of symbols from a last symbol of a transmitted PDCCH for confirming the failure recovery information.

* * * * *